Jan. 23, 1968 H. HERMAN ET AL 3,364,959
BEVERAGE DISPENSER
Filed Dec. 13, 1965 4 Sheets-Sheet 1

INVENTORS
HAMILTON HERMAN
BERNARDUS M. ZWART, JR.
BY
Arthur J. Plantamura
ATTORNEY

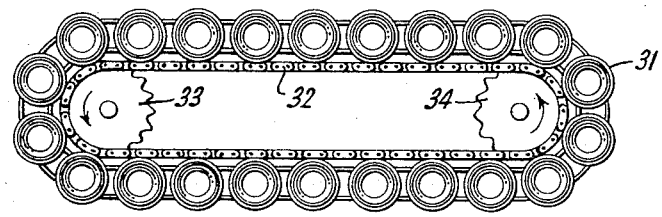
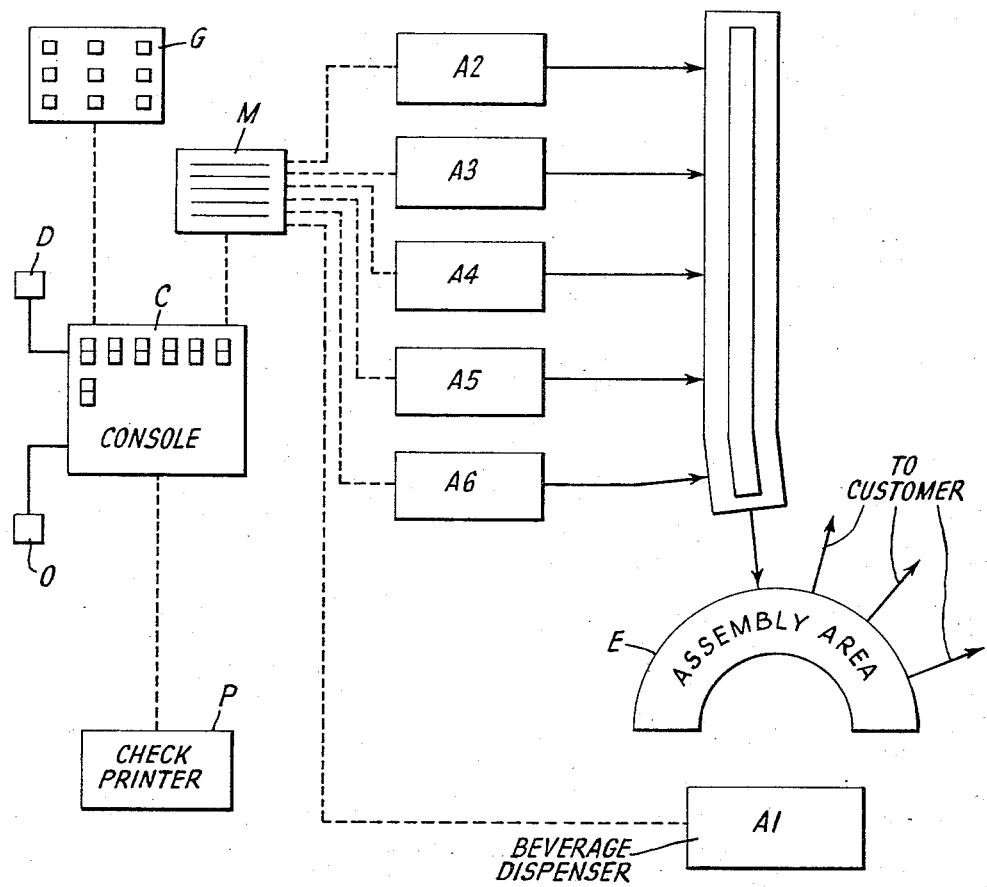

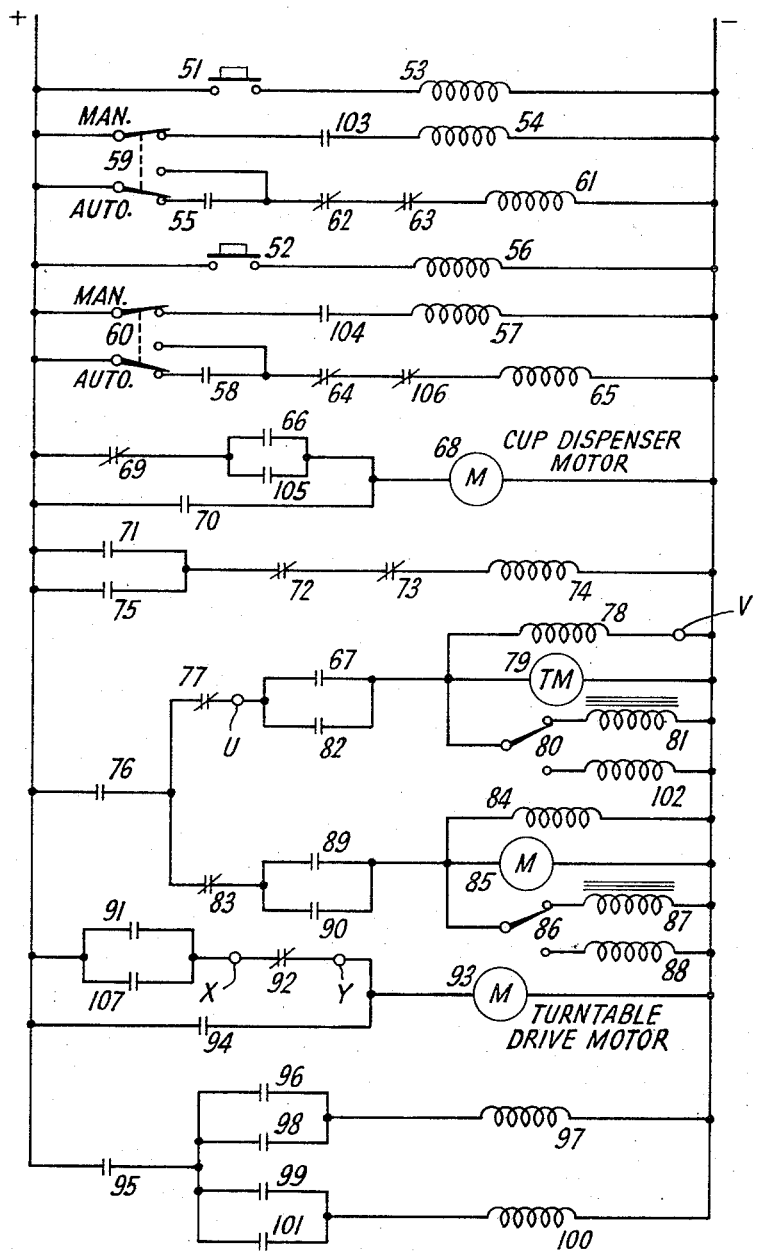

# United States Patent Office 3,364,959
Patented Jan. 23, 1968

3,364,959
BEVERAGE DISPENSER
Hamilton Herman and Bernardus M. Zwart, Jr., New Canaan, Conn., assignors to American Machine & Foundry Company, a corporation of New Jersey
Filed Dec. 13, 1965, Ser. No. 513,223
5 Claims. (Cl. 141—155)

ABSTRACT OF THE DISCLOSURE

A liquid dispenser comprising:
A reservoir having a nozzle with a valve, a conveyor disposed adjacent to said nozzle and having a step-type drive means, a cup dispenser disposed adjacent to said conveyor and said nozzle, coordinating means coupled to said cup dispenser and said drive and said valve to automatically place a series of cups on said conveyor and to fill said cups, and shut-off means coupled to said coordinating means to automatically stop the placing and filling of said cups when a fixed number of cups are filled.

---

This invention relates to an electrically controlled liquid dispenser. In particular, it relates to an automatic beverage dispenser for dispensing a variety of flavors both carbonated and non-carbonated. In a more specific embodiment the invention relates to a beverage dispenser capable of automatically preparing a pre-determined backlog of drinks on demand preparatory to serving them to customers. In particular, the invention is directed to a beverage machine of this kind which may be incorporated into an automated system which prepares and dispenses a variety of food items ready for consumption by a customer.

Systems of this kind may be remotely actuated and comprise a centrally located attended control station where orders for food items are received at the control station either directly or remotely by telephones connected to dining areas or by other voice communication means such as a microphone at a drive-in station of an automobile parking area, and where, through electronic ordering and billing equipment, a plurality of different food preparation machines are commanded to simultaneously or individually cook or otherwise process and dispense food items.

The beverage machine is characterised by its reliable on-demand capability. It is independently operable, that is, it is distinguished from continuous production units so that even though one or more hours may have elapsed since a prior item was dispensed, upon demand, it functions rapidly and dependably to dispense a single, or an indefinite plurality of items. Moreover, the machines of the invention differ from machines of the prior art such as those normally referred to as coin operated vending machines, in that it is capable of sequentially accepting and storing in a memory device a plurality of orders so that the delay normally involved in waiting for completion of a previous order before calling for a subsequent order is avoided. A further characteristic resides in the control feature of a sequence of operations all of which may be appropriately triggered from a single electrical impulse, which, in turn, through its inherent mechanism synchronously triggers later functions to provide a device which includes the automatic dispensing and filling of containers and delivery thereof.

It is also an object of the present invention to provide a novel electrical control system for automatic beverage dispensing machines.

It is another object of the invention to provide a novel apparatus capable of automatically responding on demand to dispense a container in position, fill the container with a beverage and index the filled container away from the filling spout.

It is a further and more particular object of the invention to provide a self-contained automatic machine of this kind which may be readily incorporated in an electronic ordering and billing system so that upon remote command the machine dispenses a pre-selected beverage and indexes the beverage away from the fill position, so that it does not interfere with subsequently ordered beverages to be dispensed at the same station.

It is yet a further object of the invention to provide a machine capable of accepting and processing individual independent orders for a beverage of a pre-selected flavor and of accepting and processing successive orders for any of a variety of flavors of either carbonated or non-carbonated beverages at the same time that it is processing a previous order.

It is another object of the invention to provide a varied flavor beverage dispenser which can store in a memory device a substantial backlog of orders for beverages as well as a backlog of filled containers and which is automatically shut off when the desired backlog is accumulated or is halted when the capacity of the accumulator is reached and again dispenses as orders are removed from the accumulator.

The above and other objects, features, and advantages of the invention will be better understood from the following detailed description thereof when it is considered in conjunction with the accompanying drawings in which:

FIG. 3 is a plan view depicting an alternate configuration for the dispensed beverage accumulator.

FIG. 4 is a schematic diagram of an automated system in which the beverage dispenser may be incorporated with various other apparatus, and wherein a control station provides the source for initiating (through an electrical system) the preparation and delivery of a plurality of items to an assembly area.

FIG. 5 is a schematic wiring diagram of the electrical connections for control of the dispenser of the invention.

Figure 1:
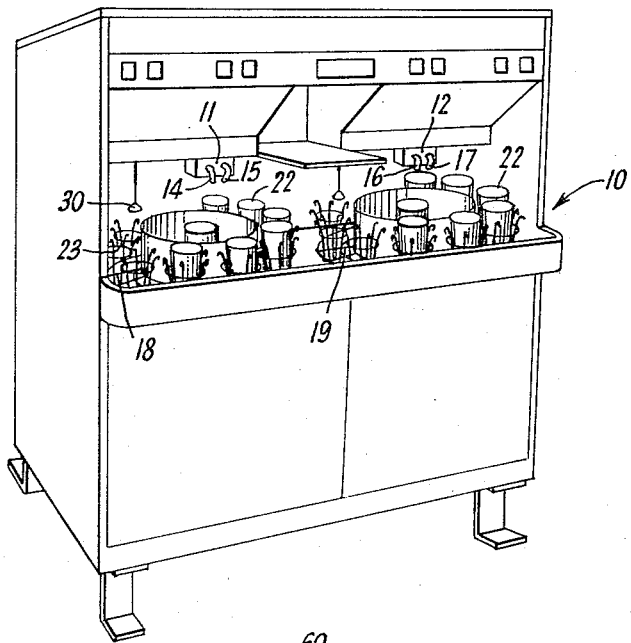
FIG. 1 is a perspective view of a beverage dispenser of the kind employed in practicing the invention.

In summary, the beverage dispenser of the invention has the capabilities of continuously accepting successive orders for beverages of a variety of flavors both carbonated and non-carbonated, of automatically dispensing the beverages in sequence and of holding them at a receiving station or transporting them to a delivery conveyor. While the liquid dispenser combination herein described may be used as a system component, it is apparent that it may also comprise a discrete unit which may be used independently. Preferably, however, it is equipped so as to be keyed into a system in which the apparatus of the invention is remotely actuated electronically with other automatic food and drink preparation machines to offer a suitable menu as illustrated, for example, in FIG. 4.

In the arrangement shown in FIG. 4, the beverage dispenser A-1 of the invention is shown in conjunction with five other automatic machines A-2 through A-6, examples of which may be one or more of the kind such as the hamburger machine disclosed in the U.S. patent to Udall et al., No. 3,266,442 of Aug. 16, 1966, entitled "Food Preparing Apparatus," and assigned to the present assignee; the frankfurter machine disclosed in the pending U.S. application of A. Gassmann, Ser. No. 445,921, entitled "Automatic Cooking Machine," also assigned to the present assignee, and the food frying machine disclosed in the pending U.S. application of H. C. Congelli, Ser. No. 492,742, entitled "Automatic Fryer," also assigned to the present assignee.

The system which synchronizes the electronic control system with the food preparing machines functions generally in the following manner:

Orders from outside sources, such as a dining room D and an outside drive-in parking lot O, are received by an attendant generally through remote voice communication at console C. The attendant enters the order into the console C and thereby actuates the food preparing machines and the printer P which prints out a check. The printer P is preferably conveniently situated contiguous to the assembly area E where the prepared food orders are assembled. When keys of the console C are actuated to provide the necessary impulses to initiate operation of the respective automatic food processing machines, this actuation simultaneously enters the food orders through the memory M for the appropriate machine A-1 through A-6, respectively. The memory unit serves to rapidly accept and store (or backlog) a quantity of orders and feeds the orders individually into the machines when the machine is capable of accepting an order. As the order is accepted by the machine, the backlog stored in the memory is automatically reduced correspondingly by the order in process. This process continues automatically until all stored orders are depleted. A bank of electric order counters G records and provides a read-out of the number of orders passing through each machine to aid in inventory and food replenishment schedules for the machines. The order and billing system likewise totals the amount of billings.

After the order, processed by the machine, is delivered to the assembly area E and assembled with its corresponding printed check, it is delivered by an attendant, e.g., a waitress or car-hop to the ordering customer. Greater details of a suitable electronic billing and ordering system, useful in conjunction with the invention, are provided in the U.S. patent to N. Alpert et al., No. 3,267,436 of Aug. 16, 1966, entitled "Electronic Ordering, Price Computing and Billing System," and assigned to the present assignee.

Referring to the drawing, the beverage dispenser in configuration is generally of conventional commercial design insofar as the cabinet 10 which houses the various beverage reservoirs and refrigeration apparatus is concerned. A source of carbon dioxide, which is optional, may be contained in compartment 10, or it may be situated at a remote position and appropriately tied in according to known techniques.

In the arrangement described, two beverage dispensing stations 11 and 12, each of which is provided with a pair of converging nozzles 14 and 15, and 16 and 17, respectively. The streams from each pair are directed to fill a cup positioned at the respective station for each pair of nozzles. Any number of different beverages permitted by practical considerations may be dispensed from each nozzle including carbonated as well as non-carbonated flavors. A dispensing cabinet of commercial size, for example, readily houses eight 5-gallon containers.

To take better advantage of the automatic dispensing characteristic, the combination of the invention includes a suitable means to accumulate beverages dispensed so that when there is a backlog of orders for beverages, the orders can continue to be filled to a desired extent without waiting for the immediately preceding drink to be removed from a position beneath the dispensing nozzles. For this purpose, moveable container supports, such as turntables, two of which are illustrated as 18 and 19, are arranged to position cups 22 which are held in suitable cup retainers 23. A suitable drive, preferably intermittent in motion such as a geneva drive mechanism 25 actuated through motor 26 rotates the supports 18 and 19, positioning the cups at stations 11 and 12 respectively for the filling operation.

An electrically operated cup dispenser, the details of which are not shown, preferably holds a substantial supply of cups 28 which dispenses cups individually into the cup supports 23. Suitable cup dispensers are available commercially; one kind which may be adapted in conjunction with the invention, for example, is Model M-7073 Simplex Cup Dispenser, available from National Rejectors, Inc., of St. Louis, Mo. The switching mechanism which triggers the delivery of the empty cup and the liquid beverage as well as the pre-determined backlog limit switch 30 will be described in greater detail in connection with the accompanying wiring schematic.

Any suitable configuration may be employed for the container cup accumulator 18. As shown in FIG. 3, a generally oval configuration comprising cup supports 31 mounted to an oblong chain conveyor 32 and suitably driven on sprockets 33 and 34 by a motor (not shown) may be employed. The arrangement of configuration of FIG. 3 lends itself more suitably to a dispenser having a single cup filling station.

It will be understood from the description provided in connection with FIG. 5 that a machine having one or a plurality of stations is contemplated and that one or more nozzles at each station may be used. For example, at a single station, instead of two, four or more nozzles may be arranged to dispense various beverages each of which may be optionally carbonated.

In FIG. 5 an electrical schematic of a portion of the control circuitry for dispensing two flavors from station 11 is shown. In the interest of clarity and brevity the schematic for station 12, which is essentially a duplicate of that for station 11, is not shown. Also, it is to be understood that any reasonable number of flavors can be provided for by duplicating the circuitry shown. Conventional standard circuit elements such as power switches, fuses, circuit breakers, and the like, required by standard practice as well as the circuitry for refrigeration and carbonation which is of standard type and well-known to those skilled in the art are omitted.

The ordering device for one of the beverages, "Beverage A" to be dispensed at station 11 is shown as a push button 51 and that for "Beverage B" as a push button 52; however, any device giving a discrete pulse for each item desired, such as an electronic ordering device described in the earlier-mentioned application S.N. 219,222 may be used.

The memory unit for "Beverage A" consists of an add coil 53, a subtract coil 54 and a switch 55. Similarly the memory coil 57, and a switch 58. Each memory unit also contains counting wheels (not shown) driven by means of a ratchet and pawl by the add coils 53 and 56 and the subtract coils 54 or 57. The arrangement is such that each add pulse will drive the counting wheels one unit upward and each subtract pulse will drive the counting wheels one unit downward. Cams (not shown) attached to the counting wheels close the switches 55 or 58 whenever the counting wheels of the associated memory unit indicate one or more drinks on order. A suitable memory unit, for example, is that available as Model F-165 from Presin Company of Bridgeport, Conn.

For purposes of illustration it is assumed that both memory units indicate no orders and that all switches and relay contacts are in position as shown in the schematic of FIG. 5. A cup is in the turntable 18 under the dispensing nozzles 14 and 15. Orders for several portions of "Beverage A" are placed by actuating switch 51 a number of times equal to the number of containers desired. Similarly, orders are placed for "Beverage B" by actuating switch 52. Simultaneously with the placement of orders for "Beverage A," memory switch 55 closes as described above. Current then flows through one pole of the "manual-off-automatic" switch 59, memory switch 55 and normally closed relay contacts 62 and 63 energizing relay coil 61 and actuating its associated contacts 64, 66, and 67. When relay contact 64 is actuated, it opens the circuit to relay coil 65 and thus prevents processing of orders for "Beverage B." The actuation of relay contact 66 completes a circuit through normally closed relay contact 69 to energize cup dispenser motor 68. The cup dispenser is so arranged that one revolution of its drive shaft completes the cycle to dispense one cup.

Attached to the cup dispenser drive shaft are two cams (not shown) which actuate switches 70 and 71. As soon as the cup dispenser drive shaft starts to turn, switch 70 closes and stays closed until one cup dispensing cycle has been completed and then it opens. Shortly after switch 70 closes, switch 71 is momentarily closed. Momentary closure of switch 71 completes the circuit through normally closed relay contacts 72 and 73 energizing relay coil 74 and actuating its associated contacts 75, 69, and 76. Closing of contact 75 completes a parallel circuit to relay coil 74, keeping relay coil 74 energized after cup dispenser switch 71 has opened. Actuation of contact 69 opens one of the two parallel circuits to the cup dispenser motor 68, thus assuring that the cup dispenser motor will stop after one cup has been dispensed and will not start again until the dispensing of the beverage has been completed, the full cup moved away and an empty cup moved to the pouring station 11.

Actuation of relay contact 76 completes a circuit through normally closed relay contact 77 and previously closed relay contact 67, simultaneously energizing relay coil 78, pour timer motor 79, and, through pour timer switch 80, the "Beverage A" pour solenoid valve 81. Completion of the circuit to "Beverage B" pour controls (relay coil 84, pour timer 85, and pour solenoid valve 87) is prevented by open relay contacts 89 and 90.

At this point in the cycle a cup is dropped into one of the holders 23 in the turntable 18 as "Beverage A" is dispensed into the cup dropped during the previous cycle. The cup dispenser cycle is adjusted so that a cup is dropped into a holder 23 in the turntable before pouring of the beverage is completed.

When relay coil 78 is energized its associated contacts 82, 83, and 96 are actuated. Contact 82 completes a parallel holding circuit for the "Beverage A" pouring controls (i.e., 78, 79, 80, and 81). Contact 83 further disables the "Beverage B" pouring controls (i.e., 84, 85, 86, and 87). Contact 96 partially completes the circuit to the reset relay coil 97.

An adjustable cam (not shown) is mounted on the shaft of the pour timer motor 79 which acuates the pour timer switch 80. As is well known, by adjusting this cam the time that the pour solenoid valve 81 is energized can be adjusted, and hence the amount of beverage dispensed can be controlled. At the end of the pre-set pouring interval the pour timer switch 80 is actuated, de-energizing the pour solenoid valve 81 and energizing relay coil 102 which actuates its associated contact 91 and 103. Contact 91 completes the circuit to the turntable drive motor 93 through the normally closed backlog switch 92. Contact 103 completes the circuit to the "Beverage A" memory unit subtract coil 54 through the second pole of the "manual-off-automatic" selector switch 59 which reduces the "Beverage A" order backlog by one unit.

Figure 2:
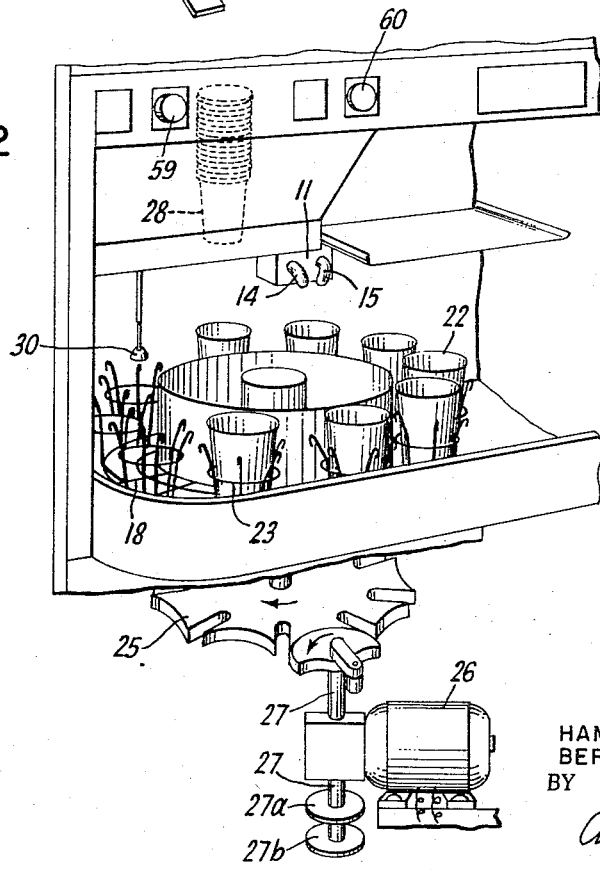
FIG. 2 is an enlarged view illustrating the dispenser and accumulator arrangement in greater detail and including a drive and indexing means.

The turntable 18 (FIGS. 1, 2) is connected, by means of an intermittent drive mechanism 25, to the drive motor 26 in such a way that one revolution of the drive shaft 27 will result in the turntable indexing one cup station. Attached to the drive shaft 27 are two cams 27(a) and 27(b) which actuate switches 94 and 95, respectively. Switch 94 is closed as soon as the drive motor 26 starts and stays closed until the drive shaft 27 makes one revolution. This assures that the turntable 18 will index one cup station even though relay contact 91 and/or the backlog switch 92 are opened before the indexing is completed. The turntable 18 moves the filled cup away from the pouring station and simultaneously brings the empty cup previously dispensed to the pouring station.

Just before the switch 94 opens to stop the turntable drive motor 26, switch 95 is momentarily actuated, completing the circuit to relay coil 97 through previously closed contact 96. Energizing relay coil 97 actuates its associated contacts 98, 72, and 63. Contact 98 establishes a parallel holding circuit assuring that relay coil 97 will stay energized as long as turntable switch 95 is closed even though relay contact 96 is opened. Contact 72 opens the circuit to relay coil 74 which, in turn, causes relays 78 and 102 to drop out and pour timer 79 to reset.

As there are still backlogged orders for both "Beverage A" and "Beverage B," memory switches 55 and 58 will be closed. When relay contact 63 opens, it breaks the circuit to relay coil 61 and releases its associated contacts 64, 66, and 67. This allows a circuit to be completed to relay coil 65 through normally closed contacts 64 and 106. Energizing relay coil 65 actuates its associated contacts 62, 105, and 89 and initiates a dispensing cycle for "Beverage B" similar to that for "Beverage A." Contacts 62 blocks relay coil 61. Contact 105 starts the cup dispenser, and contact 89 activates the "Beverage B" pour cycle timer motor 85 and switch 86, relay coil 84 and pour solenoid valve 87. "Beverage A" pour controls are rendered inoperative by relay contact 77 actuated by relay coil 84. At the end of the "Beverage B" pour cycle, relay coil 88 will be energized, actuating contact 107 which will start the turntable motor 93. Energizing relay coil 88 also will actuate relay contact 104, thus energizing "Beverage B" memory unit subtract coil 57 and reducing "Beverage B" order backlog by one unit. As the turntable motor 93 turns, it will actuate switches 94 and 95 as described above.

When turntable switch 95 is momentarily closed, relay coil 100 will be energized through previously closed relay contact 99, which, in turn, will open contacts 106 and 73, resetting the "Beverage B" pour controls and allowing a "Beverage A" dispensing cycle to begin. Contact 101 maintains a parallel circuit to relay coil 100 as long as switch 95 is closed, even though contact 99 opens. As long as there are back orders for both beverages the machine will dispense them alternately. When the demand has been satisfied for one flavor, the machine will continue to dispense the other until its demand has been satisfied.

Should filled cups be allowed to accumulate in the turntable to the point where only one station remains empty (under the cup dispenser, the cup which on the next index would move to the cup dispensing station will actuate through sensor 30 a backlog limit switch 92 opening the circuit to the turntable drive motor 93. In this condition the next cycle will be allowed to start and proceed to the point where a cup has been filled and an empty cup dropped into the remaining empty station in the turntable. At this point the cycle will stop and remain stopped until the cup which engages element 30 is removed from the turntable; thereupon, the cycle will resume and run to completion.

A three-position "manual-off-automatic" switch 59 and 60 has been provided for each flavor. When either of these switches is placed in the "manual" position, it will simulate an infinite back order for tha tparticular beverage and therefore cause the machine to dispense that beverage until the turntable 18 is full or the switch is put in the "off" or "automatic" position. Placing both switches in the manual position will cause the machine to dispense both flavors alternately until the turntable is full or the switch is changed.

It will be apparent that the two selector switches 59 and 60 are independent of each other and that, as long as at least one switch is in a position other than the "off," the machine will operate according to the mode selected.

The selector switches 59 and 60 allow one beverage to be taken from service, for example for refilling, without affecting the other. The memory unit will maintain a count of unfilled orders when a flavor is out of service and when that flavor is restored to automatic operation, the back orders will be filled.

While a time interval dispensing means is suitable and may be preferable for dispensing liquids having a substantially uniform density, such as water, tea, soft drinks, etc., certain beverages, such as milk shakes containing ice cream, vary considerably in density from one serving to the next, because of slight differences in temperature and the amount of air beaten into the mix during preparation. Portions of such density-variable beverages dispensed on a time- or weight-basis will frequently over- or under-fill the serving container. This effect precluding reliable desired level dispensing can be eliminated by a level sensing device which cuts off flow of the portion when a pre-determined level is reached in the container. A photo cell control, such as that disclosed in U.S. Patent 2,633,477, for example, may be adapted into the combination of the invention. A scheme utilizing a photoelectric cell is described by reference to FIG. 7, which depicts a fragmentary electrical schematic extending from U' to V' which may be substituted for that portion U to V in FIG. 5 thereby replacing components 67, 78, 79, 80, 81, 82, and 102 of FIG. 5.

Figure 6:
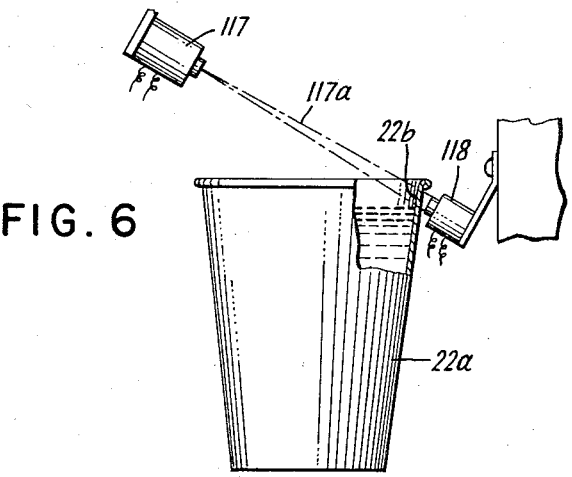
FIG. 6 is a schematic diagram of an alternate form of liquid level detector.

Operation of the circuit with segment U'-V' is the same as that described above for the circuit of FIG. 5 until relay contact 76 is closed completing a circuit through normally closed relay contact 77 and previously closed relay contact 67. Completion of this circuit energizes a lamp 117 so mounted as illustrated in FIG. 6 that the light emitted will pass through the translucent rim 22(b) of the container 22(a) and fall upon the light-sensitive surface of the photocell 118. The photocell 118 is arranged and constructed so that, when light of sufficient intensity is applied, a current will flow through relay coil 119, actuating its associated contacts 120, 125 and 126. Actuation of relay contact 120 completes a circuit through normally closed relay contact 121 to the pour solenoid valve 122, opening the valve and thus initiating the dispensing of the beverage. Actuation of relay contact 126 opens the circuit to relay coil 128, thus preventing its operation as long as beverage is being dispensed. Actuation of relay contact 125 energizes relay coil 124, which, in turn, actuates its associated contacts 123, 127, and 130. Actuation of relay contact 123 completes a parallel circuit to relay coil 124, keeping it energized even though relay contact 125 opens. Relay contact 130 completes a parallel circuit around relay contact 67. Relay contact 127 partially completes the circuit to relay coil 128.

Figure 7:
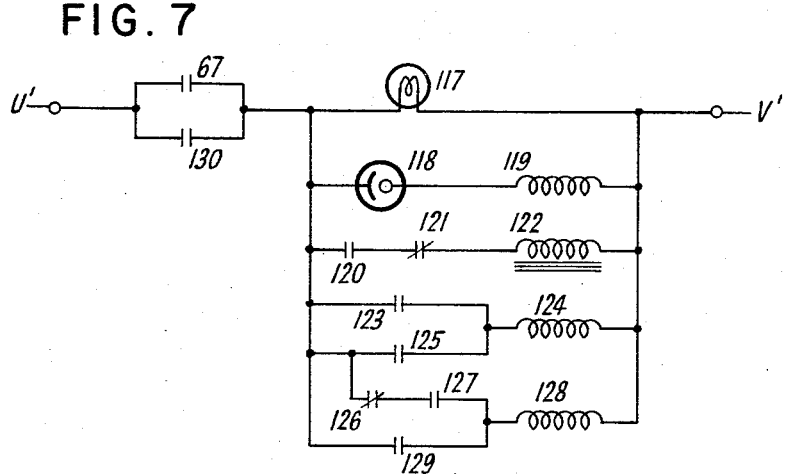
FIG. 7 is a fragmentary wiring schematic illustrating the electrical interconnection of the photoelectric liquid level sensor.

When the beverage level in the container rises to the pre-determined point, it interrupts the light beam 117(a) to the photocell 118, which, in turn, interrupts the current to relay coil 119 and drops out its associated contacts 120, 125, and 126. Relay contact 120 opens the circuit to solenoid valve 122 which stops the dispensing. Relay contact 125 opens one of the parallel circuits to relay coil 124. Normally closed relay contact 126 completes the circuit through previously closed relay contact 127 to relay coil 128 thus actuating its associated contacts 91, (FIG. 5), 121, and 129. Relay contact 91 initiates the turntable cycle as previously described in connection with FIG. 5. Contact 121 opens the circuit to the pour solenoid valve 122 preventing any further dispensing until the whole cycle has been concluded. Contact 129 maintains a parallel circuit to relay coil 128. From this point, the system operates as described for FIG. 5. When relay contact 77 opens, all previously energized components of FIG. 7 are de-energized and reset for the next cycle.

Figure 8:
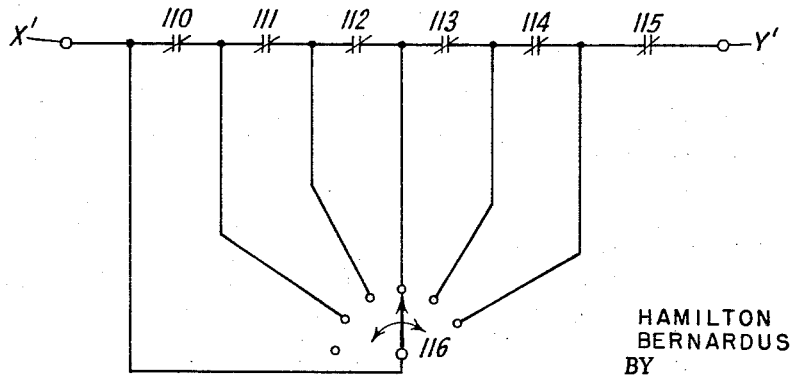
FIG. 8 is a fragmentary wiring schematic illustrating the device for pre-setting a variable portion back log.

In certain types of restaurant operation it is desirable at times to prepare food items ahead in anticipation of sales peaks. FIG. 8 is a fragmentary electrical schematic showing one method by which the circuitry of FIG. 5 can be modified to provide an adjustable backlog of filled orders for any or all of the beverages dispensed.

As shown in FIG. 8, the backlog switch 92 located between points X and Y of FIG. 5 is removed and replaced by components 110 through 116, arranged as shown in the fragmentary schematic X'-Y' of FIG. 8. Normally closed limit switches 110 through 115 are disposed about the periphery of the turntable 18 in such a way that there is a switch actuator at each cup position when the turntable 18 is at rest. A cup in a given station or holder 23 of the turntable will actuate the associated limit switch as the turntable 18 completes an index. A rotary selector switch 116 selects the particular limit switch which determines the size of the backlog. For purposes of illustration, switch 110 will be one station past the filling station in the direction of cup travel and switches 111 through 115 will be located in numerical order at subsequent cup positions.

Although a maximum backlog of seven portions is illustrated, it will be apparent that a greater number is obviously contemplated. Also, each of the backlog switches may represent multiple portions of any number, such as 3, 5, 10, etc., so that, for example, actuation of switch 110 would represent a backlog of three portions, switch 111 five portions, switch 112 nine portions, and so on.

To establish and maintain a desired backlog of filled orders the selector switch 116 is set to the desired quantity. The "manual-off-automatic" switch 59 and/or 60 (FIG. 5) for the desired flavor(s) is placed in the manual position. In the case of a total backlog of seven, as represented by switches 110–115, the dispenser will start dispensing and continue to dispense until the first cup filled actuates switch 113. At this point, one more portion will be dispensed. The turntable will not move, however, as explained above for FIG. 5. The cycle stops at this point and will not resume until the cup actuating switch 113 has been removed. When the cup is removed, the cycle will be completed and a new cycle will start. If both switches 59 and 60 are in the manual position, the backlog will contain two flavors alternately. If one switch, for example switch 60, is left in the automatic position, the backlog will consist of all beverage "A" with beverage "B" being dispensed only when an actual order is received by the machine.

Although the foregoing describes the application of the backlog circuitry of FIG. 8 to a turntable-type accumulator, it will be understood that it can be applied to various other accumulating devices, such as a straight-line conveyor with suitable backlog limit, or to an oval conveyor such as the kind illustrated in FIG. 3.

While only specific embodiments of the invention have been described, it will be understood that the invention is capable of variation by one skilled in the art, based on the novel concept set forth, so that the invention is not to be limited except as required by the claims appended hereto.

We claim:

1. An automatic liquid portion dispensing apparatus comprising in combination:

a liquid reservoir and means connected to said reservoir for dispensing liquid therefrom into a container through a nozzle:

an electrically actuated valve on said nozzle to regulate the flow of liquid;

a movable support on which containers are accumulated to receive empty containers, to position same at a filling station below said nozzle, and to remove them from said filling station after a pre-determined amount of liquid has been introduced into said container;

means to index said support to carry the filled containers away from said filling station after liquid has been dispensed therein;

a container delivery unit to deposit containers individually on said support, said unit being electrically coordinated so as to prevent the delivery of a subsequent container until the valve has been actuated to dispense liquid and said support has been indexed;

means responsive to a pre-determined backlog of filled containers contiguous to said support to prevent the further delivery of containers and liquid so long as the pre-determined backlog of filled containers is present on said support; and means for electrically coordinating the delivery of containers and the filling thereof and the indexing of said container support in alignment with said nozzle; and wherein said filling station is provided with a plurality of liquid dispensers, each of which is arranged to flow a different flavor beverage into a container at said station, and wherein the dispensing valves are electrically coordinated, so that at any given dispensing cycle, beverage flows from one dispenser only; and in which the apparatus incorporates a memory device to retain a backlog of orders for the different flavor beverage and to command the apparatus to dispense such orders individually.

2. The apparatus of claim 1, wherein said dispensers are equipped to dispense carbonated and non-carbonated beverage.

3. An automatic food and beverage preparing and dispensing system comprising a remote order signal generating and order memory storing means, which accepts consecutive orders and relays such orders individually to the apparatus of claim 1, wherein said apparatus is electrically connected, and is responsive to said signal means.

4. An automatic liquid portion dispensing apparatus comprising in combination:

a liquid reservoir and means connected to said reservoir for dispensing liquid therefrom into a container through a nozzle;

an electrically actuated valve on said nozzle to regulate the flow of liquid;

a movable support on which containers are accumulated to receive empty containers, to position same at a filling station below said nozzle, and to remove them from said filling station after a pre-determined about of liquid has been introduced into said container;

means to index said support to carry the filled containers away from said filling station after liquid has been dispensed therein;

a container delivery unit to deposit containers individually on said support, said unit being electrically coordinated so as to prevent the delivery of a subsequent container until the valve has been actuated to dispense liquid and said support has been indexed;

means responsive to a pre-determined backlog of filled containers contiguous to said support to prevent the further delivery of containers and liquid so long as the pre-determined backlog of filled containers is present on said support; and means for electrically coordinating the delivery of containers and the filling thereof and the indexing of said container support in alignment with said nozzle; and wherein said filling station is provided with a plurality of liquid dispensers, each of which is arranged to flow a different flavor beverage into a container at said station, and wherein the dispensing valves are electrically coordinated, so that at any given dispensing cycle, beverage flows from one dispenser only; and wherein said dispensers are equipped to dispense carbonated and non-carbonated beverage.

5. A liquid dispenser comprising:
a reservoir having a nozzle with a valve,
a conveyor disposed adjacent to said nozzle and having a step-type drive means,
a cup dispenser disposed adjacent to said conveyor and said nozzle,
coordinating means coupled to said cup dispenser and said drive and said valve to automatically place a series of cups on said conveyor and to fill said cups,
a shut-off means coupled to said coordinating means to automatically stop the placing and filling of said cups when a fixed number of cups are filled, and
a remote order signal generating and order memory storing means connected to said coordinating means.

References Cited
UNITED STATES PATENTS

| | | | |
|---|---|---|---|
| 2,574,595 | 11/1951 | Shaw | 141—155 |
| 2,750,092 | 6/1956 | Grassman et al. | 222—76 |
| 2,941,644 | 6/1960 | Zeigle et al. | 194—10 |
| 2,953,171 | 9/1960 | Arnett et al. | 141—174 |
| 2,995,158 | 8/1961 | Oberg | 222—129.4 |
| 3,023,790 | 3/1962 | Zaruba | 141—160 X |
| 3,145,741 | 8/1964 | Smith | 141—160 X |

ROBERT B. REEVES, Primary Examiner.

H. S. LANE, Examiner.